(12) United States Patent
Else et al.

(10) Patent No.: US 12,354,591 B2
(45) Date of Patent: Jul. 8, 2025

(54) VOICE ACTIVATED PREMISES DEVICE ENROLLMENT IN A SECURITY SYSTEM

(71) Applicant: The ADT Security Corporation, Boca Raton, FL (US)

(72) Inventors: Steven Else, Deerfield Beach, FL (US); Jatin Patel, Boca Raton, FL (US)

(73) Assignee: The ADT Security Corporation, Boca Raton, FL (US)

( * ) Notice: Subject to any disclaimer, the term of this patent is extended or adjusted under 35 U.S.C. 154(b) by 284 days.

(21) Appl. No.: 18/088,324

(22) Filed: Dec. 23, 2022

(65) Prior Publication Data

US 2024/0212665 A1 Jun. 27, 2024

(51) Int. Cl.
| | |
|---|---|
| *G10L 15/00* | (2013.01) |
| *G06F 21/32* | (2013.01) |
| *G10L 13/027* | (2013.01) |
| *G10L 15/22* | (2006.01) |

(52) U.S. Cl.
CPC ............ *G10L 13/027* (2013.01); *G06F 21/32* (2013.01); *G10L 15/22* (2013.01); *G10L 2015/223* (2013.01)

(58) Field of Classification Search
CPC .......... G10L 15/22; G06F 3/167; G08B 25/00
See application file for complete search history.

(56) References Cited

U.S. PATENT DOCUMENTS

| | | | | |
|---|---|---|---|---|
| 7,119,658 | B2 * | 10/2006 | Stilp | .................... G06K 7/0008 340/5.61 |
| 9,641,885 | B2 * | 5/2017 | Nye | .................. H04N 21/42203 |
| 10,102,855 | B1 * | 10/2018 | Sindhwani | .............. G10L 15/22 |
| 10,839,853 | B2 * | 11/2020 | Iyer | ..................... H04N 21/8352 |
| 2004/0215750 | A1 * | 10/2004 | Stilp | ...................... G08B 25/10 709/220 |
| 2014/0266687 | A1 | 9/2014 | Britton | |
| 2015/0324179 | A1 * | 11/2015 | Nye | .................. H04N 21/42203 704/275 |
| 2017/0192399 | A1 * | 7/2017 | Ramakrishnappa | ......................... G08B 25/003 |
| 2018/0293864 | A1 | 10/2018 | Wedig et al. | |
| 2018/0308475 | A1 | 10/2018 | Locke et al. | |
| 2019/0114904 | A1 | 4/2019 | Subramanian | |
| 2022/0051678 | A1 * | 2/2022 | Panchapakesan | ..... H04L 9/0825 |

* cited by examiner

*Primary Examiner* — Daniel Abebe
(74) *Attorney, Agent, or Firm* — Weisberg I.P. Law, P.A.

(57) ABSTRACT

A control device in a premises security system is provided. The control device receives a voice command or a touch-based input to initiate an enrollment of a premises device in a premises security system and synthesizes a plurality of audio clips for playback on a speaker. Each audio clip requests respective premises device information. In response to playback of the audio clips, the control device receives a plurality of voice responses, maps each of the plurality of voice responses to a plurality of respective attributes of a premises device, determines a premises device configuration or a premises security system configuration based at least in part on the plurality of respective attributes, and enrolls the premises device in the premises security system based at least in part on the premises device configuration or the premises security system configuration.

18 Claims, 4 Drawing Sheets

VOICE ACTIVATED PREMISES DEVICE ENROLLMENT IN A SECURITY SYSTEM

TECHNICAL FIELD

The present technology is generally related to premises device enrollment using voice commands in a premises security system control device.

BACKGROUND

Some existing premises security system setup solutions require an installer/technician to manually enter premises device (e.g., security sensor) information during the enrollment process, which may be very time consuming. Some existing solutions have attempted to improve the enrollment process by allowing installers to perform automatic enrollment of premises devices, but such solutions still typically require many manual entries to be performed by the installer to complete the installation.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
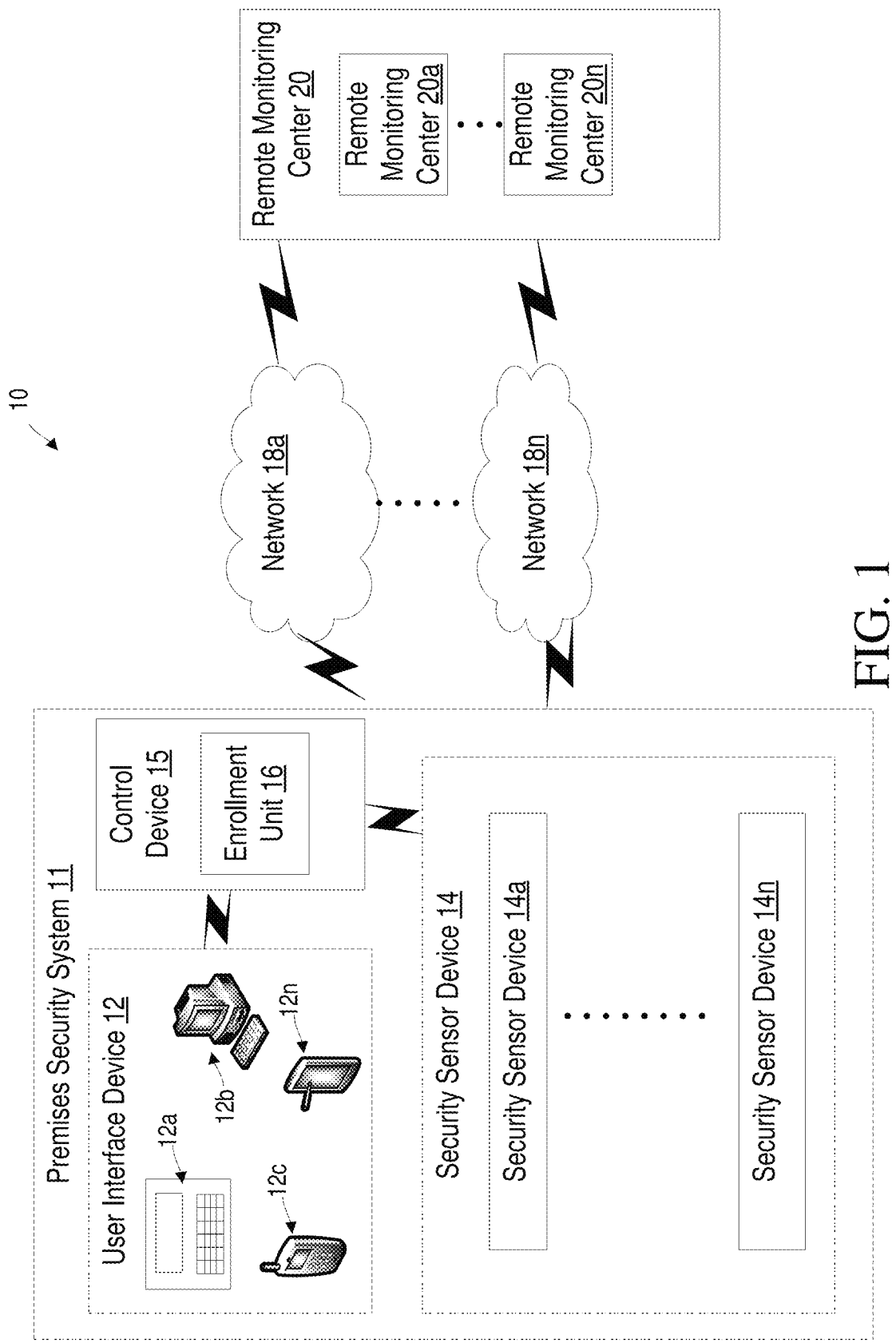
FIG. 1 is a diagram of an example system comprising a premises security system according to principles of the present disclosure.

Embodiments of the present disclosure may expedite system set up and reduce install time of a premises security system. Some embodiments may use a voice assistant to guide the installer through the premises device enrollment process, which may install any premises device, such as a security sensor, into a premises security system, and/or update system information related to premises device programming. This process may collect some or all of the information needed to program options and/or configurations related to programming premises devices. Some embodiments of the present disclosure may also be extended to other lifestyle devices in addition to premises devices.

Before describing in detail exemplary embodiments, it is noted that the embodiments reside primarily in combinations of apparatus components and processing steps related to premises device enrollment using voice commands in a premises security system control panel. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures in which like reference designators refer to like elements there is shown in FIG. 1 a system designated generally as "10." System 10 may include premises security system 11 where premises security system 11 includes and/or is associated with one or more user interface devices 12a to 12n (collectively referred to as "user interface device 12"), one or more premises devices 14a to 14n (collectively referred to as "premises device 14"), and control device 15. Control device 15 may include, e.g., a control panel.

Premises device 14 may include sensors, control panels, control devices, images capture devices, life safety devices, lifestyle devices and/or other devices. For example, the types of sensors may include various life safety related sensors such as motion sensors, fire sensors, carbon monoxide sensors, flooding sensors and contact sensors, among other sensor types. The control devices may include, for example, one or more lifestyle related devices configured to adjust at least one premises setting such as lighting, temperature, energy usage, door lock and power settings, among other settings associated with the premises or devices on the premises. Image capture devices may include digital cameras and/or video cameras, among other image capture devices. Premises device 14 may be configured for sensing one or more aspects of the environment, e.g., an open or closed door, open or closed window, motion, heat, smoke, gas, sounds, images, people, animals, objects, etc., for determining a sensor indication or message based on the sensed environment, and/or for transmitting the indication/message to another entity in the premises security system 11, e.g., control device 15, other device(s) associated with premises security system 11, etc.

System 10 may further include one or more networks 18a to 18n (collectively referred to as "network 18"), and one or more remote monitoring centers 20a to 20n (collectively referred to as "remote monitoring center 20"), communicating with each other or with at least one other entity in system 10.

User interface device 12 may be a wireless device that allows a user to communicate with control device 15. User interface device 12 may be a portable control keypad/interface 12a, computer 12b, mobile phone 12c and tablet 12n, among other devices that allow a user to interface with control device 15 and/or one or more premises devices 14. User interface device 12 may communicate at least with control device 15 using one or more wired and/or wireless communication protocols. For example, portable control keypad 12a may communicate with control device 15 via a ZigBee based communication link, e.g., network based on Institute of Electrical and Electronics Engineers (IEEE) 802.15.4 protocols, and/or Z-wave based communication link, or over the premises' local area network, e.g., network-based on Institute of Electrical and Electronics Engineers (IEEE) 802.11 protocols, user interface device 12.

The premises devices 14 may communicate with control device 15 via proprietary wireless communication protocols and may also use Wi-Fi. Other communication technologies can also be used, and the use of Wi-Fi is merely an example.

Control device 15 may provide one or more of management functions, monitoring functions, analysis functions, control functions such as power management, premises device management and alarm management and/or analysis, among other functions to premises security system 11. In particular, control device 15 may manage one or more life safety and lifestyle features. Life safety features may correspond to security system functions and settings associated with premises conditions that may result in life threatening harm to a person, such as carbon monoxide detection and intrusion detection. Lifestyle features may correspond to security system functions and settings associated with video capturing devices and non-life-threatening conditions of the premises, such as lighting and thermostat functions. Control device 15 may include an enrollment unit 16 for premises device 14 enrollment using voice commands, as described herein.

Control device 15 may communicate with network 18 via one or more communication links. In particular, the communications links may be broadband communication links such as a wired cable modem or Ethernet communication link, and a digital cellular communication link, e.g., long term evolution (LTE) and/or 5G based link, among other broadband communication links. Broadband as used herein may refer to a communication link other than a plain old telephone service (POTS) line. An Ethernet communication link may be an IEEE 802.3 or 802.11 based communication link. Network 18 may be a wide area network, local area network, wireless local network and metropolitan area network, among other networks. Network 18 provides communications among one or more of control device 15, remote monitoring center 20 and premises device 14.

Figure 2:
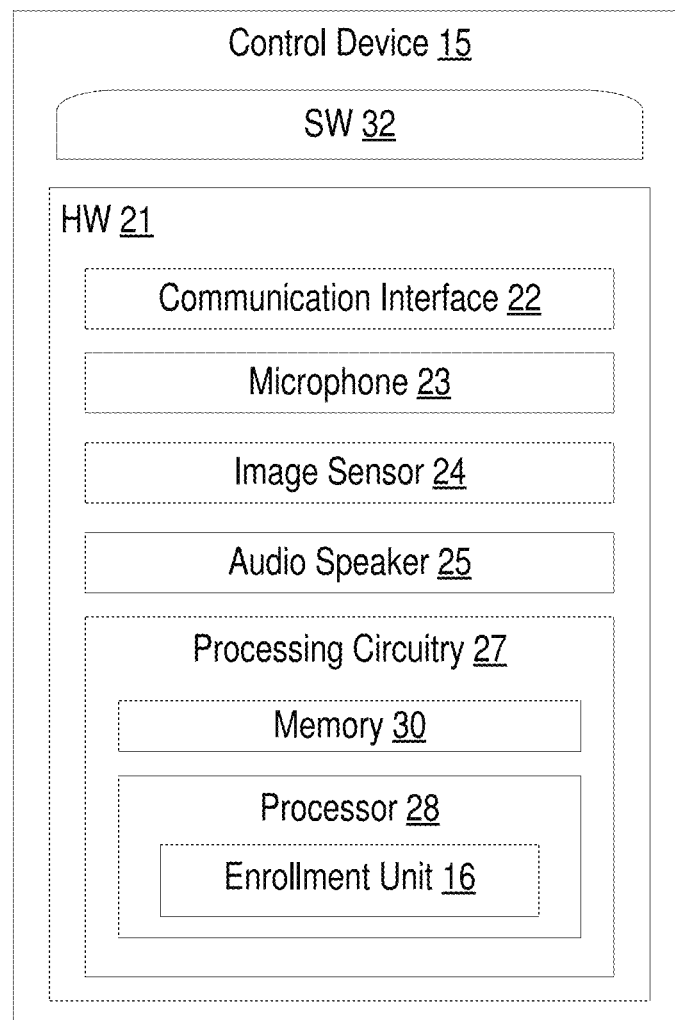
FIG. 2 is a block diagram of a control device according to some embodiments of the present disclosure.

Referring now to FIG. 2, the example system 10 includes a control device 15 that includes hardware 21 enabling the control device 15 to communicate with one or more entities in system 10 and to perform one or more functions described herein.

The hardware 21 may include a communication interface 22 for setting up and maintaining at least a wired and/or wireless connection to one or more entities in system 10 such as remote monitoring center 20, premises devices 14, user interface device 12, another control device 15, etc.

The hardware 21 may include microphone 23, which may include, for example, a voice input component, e.g., a component, such as a microphone and/or audio signal processing circuitry, to receive spoken verbal commands from a user, such as "enroll the sensor", "name the sensor", "change sensor settings", etc.

Control device 15 may include image sensor 24, which may include, for example, cameras, infrared sensors, photodetectors, laser diodes, etc., for capturing an image, e.g., of a QR code presented by an installer to the control device 15.

Control device 15 may include audio speaker 25, which may include, for example, one or more speakers, audio drivers, audio processing circuitry, etc., for generating audio and/or verbal instructions and/or messages. For example, audio speaker 25 may produce and/or generate and/or synthesize speech from text (i.e., text-to-speech).

In the embodiment shown, the hardware 21 of the control device 15 further includes processing circuitry 27. The processing circuitry 27 may include a processor 28 and a memory 30. In particular, in addition to or instead of a processor, such as a central processing unit, and memory, the processing circuitry 27 may comprise integrated circuitry for processing and/or control, e.g., one or more processors and/or processor cores and/or Field Programmable Gate Arrays (FPGAs) and/or Application Specific Integrated Circuits (ASICs) adapted to execute instructions. The processor 28 may be configured to access (e.g., write to and/or read from) the memory 30, which may comprise any kind of volatile and/or nonvolatile memory, e.g., cache and/or buffer memory and/or Random Access Memory (RAM) and/or Read-Only Memory (ROM) and/or optical memory and/or Erasable Programmable Read-Only Memory (EPROM).

Thus, the control device 15 further has software 32 stored internally in, for example, memory 30, or stored in external memory (e.g., database, storage array, network storage device, etc.) accessible by the control device 15 via an external connection. The software 32 may be executable by the processing circuitry 27. The processing circuitry 27 may be configured to control any of the methods and/or processes described herein and/or to cause such methods, and/or processes to be performed, e.g., by control device 15. Processor 28 corresponds to one or more processors 28 for performing control device 15 functions described herein. The memory 30 is configured to store data, programmatic software code and/or other information described herein. In some embodiments, the software 32 may include instructions that, when executed by the processor 28 and/or processing circuitry 27, cause the processor 28 and/or processing circuitry 27 to perform the processes described herein with respect to control device 15. For example, processing circuitry 27 of the control device 15 may include enrollment unit 16, which is configured to perform one or functions described herein such as with respect to enrollment of premises devices 14 using voice commands.

Although FIGS. 1 and 2 show enrollment unit 16 as being within a respective processor, this unit may be implemented such that a portion of the enrollment unit 16 is stored in a corresponding memory within the processing circuitry 27. In other words, enrollment unit 16 may be implemented in hardware or in a combination of hardware and software within the processing circuitry 27.

Figure 3:
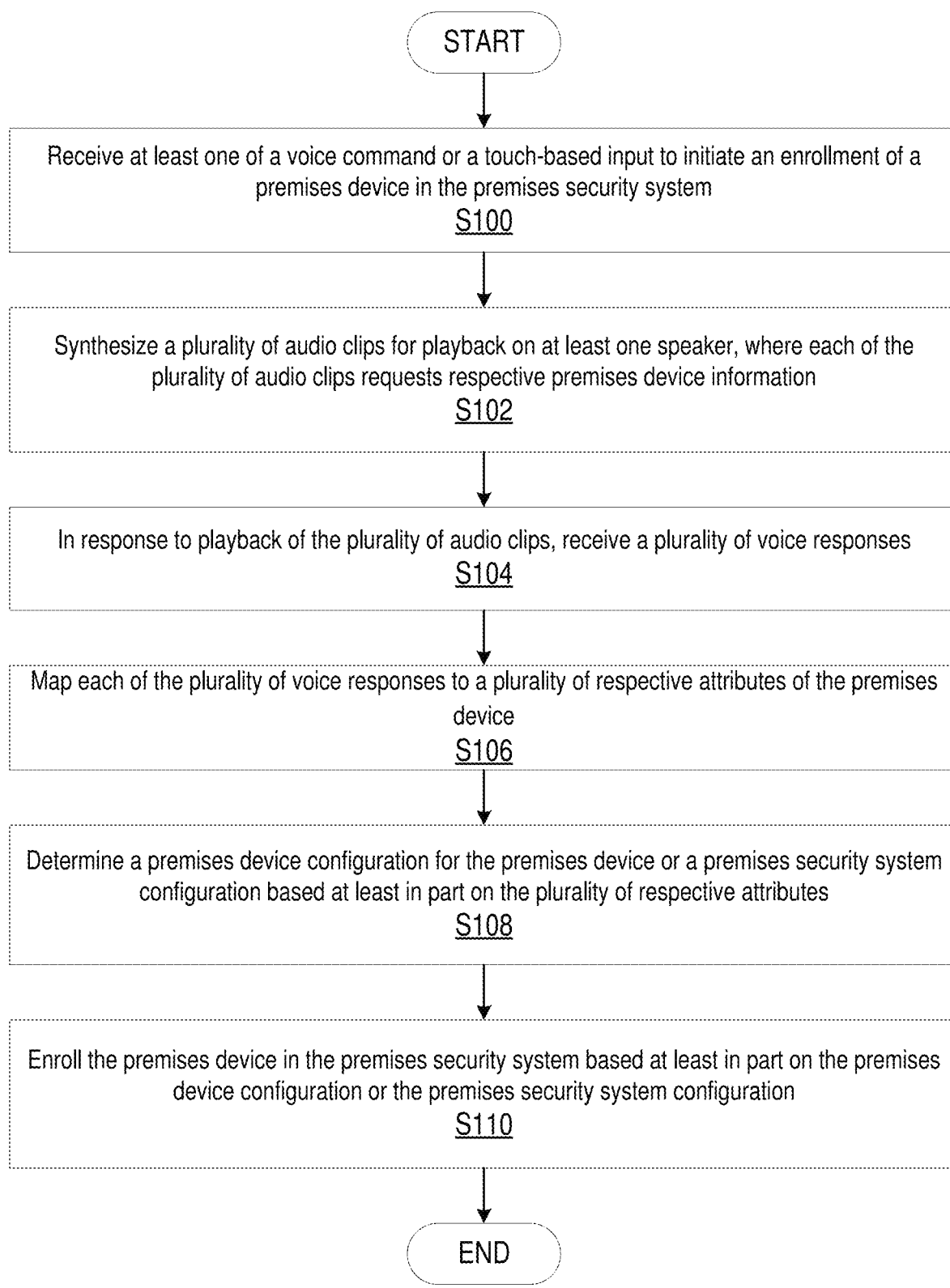
FIG. 3 is a flowchart of an example process implemented by a control device according to some embodiments of the present disclosure.

FIG. 3 is a flowchart of an example process implemented by a control device 15 according to one or more embodiments of the present disclosure. One or more blocks described herein may be performed by one or more elements of control device 15 such as by one or more of communication interface 22, microphone 23, image sensor 24, audio speaker 25, processing circuitry 27 (including the enrollment unit 16), processor 28, memory 30, etc. Control device 15 is configured to receive (Block S100) one of a voice command and a touch-based input (e.g., a button press, a touchscreen input, a switch, etc.) to initiate an enrollment of a premises device 14 in a premises security system, as described herein. Control device 15 is configured to synthesize (Block S102) a plurality of audio clips for playback on at least one speaker, where each of the plurality of audio clips requests respective premises device 14 information, as described herein. Control device 15 is configured to, in response to playback of the plurality of audio clips, receive (Block S104) a plurality of voice responses, as described herein. Control device 15 is configured to map (Block S106) each of the plurality of voice responses to a plurality of respective attributes of a premises device 14, as described herein. Control device 15 is configured to determine (Block S108) one of a premises device 14 configuration for the premises device 14 or a premises security system configuration based at least in part on the plurality of respective attributes, as described herein.

According to one or more embodiments, each of the plurality of respective attributes includes at least one of a name of the premises device 14, a location of the premises device 14, a type of the premises device 14, a sensitivity threshold of the premises device 14, or an operating mode of the premises device 14. According to one or more embodiments, mapping each of the plurality of voice responses to the plurality of respective attributes includes predicting a first attribute of the plurality of attributes based at least in part on a first voice response of the plurality of voice responses, synthesizing an additional audio clip for playback on the at least one speaker, where the additional audio clip recites the predicted first attribute and requesting a confirmation from the user, receiving an additional voice response in response to playback of the additional audio clip indicating whether the predicted first attribute is accurate, and the mapping of the first voice response to the first attribute is based at least in part on the predicted first attribute being accurate. According to one or more embodiments, the control device is further configured to predict the first attribute using a trained machine learning model, and update the trained machine learning model based at least in part on the additional voice response indicating whether the predicted first attribute is accurate. According to one or more embodiments, the determining of the premises device configuration or the premises security system configuration comprises determining a sensitivity threshold based at least in part on a first voice response of the plurality of voice responses by determining at least one modifier term of the first voice response, and mapping the at least one modifier term to a corresponding sensitivity threshold.

According to one or more embodiments, the control device 15 is further configured to synthesize an additional audio clip for playback on the at least one speaker, where the additional audio clip recites an additional instruction for the user to present one of a barcode and a quick response (QR) code associated with the premises device 14 to an image sensor of the control device, in response to playback of the additional audio clip, receive an image corresponding to the QR code or the barcode, determine at least one additional attribute based at least in part on the QR code or the barcode, and the determining of one of the premises device configuration for the premises device 14 or the premises security system configuration is further based at least in part on the at least one additional attribute According to one or more embodiments, the control device 15 is further configured to synthesize an additional audio clip for playback on the at least one speaker, where the additional audio clip recites an additional instruction for the user to place the premises device 14 in a field of view of an image sensor 24 of the control device, in response to playback of the additional audio clip, receive an image corresponding to the premises device 14, and determine a classification of the premises device 14 based at least in part on the image, and determining one of the premises device configuration for the premises device 14 or the premises security system configuration is further based at least in part on the classification. For example, control device 5 may classify the image of premises device 14 as a door sensor image of model X from vendor Y, and may use that classification to query a database and obtain one or more attributes and/or configurations (e.g., default attributes and/or default configurations) for that premises device 14.

According to one or more embodiments, the control device 15 is further configured to authenticate the user prior to enrolling the premises device 14 in the premises security system 11, the authenticating including identifying a passcode in at least one of the voice command, and at least one of the plurality of voice responses, and comparing the passcode to a reference passcode.

According to one or more embodiments, the control device 15 is further configured to authenticate the user prior to enrolling the premises device 14 in the premises security system 11 by identifying a voiceprint based at least in part on at least one of the voice command, and at least one of the plurality of voice responses, and comparing the voiceprint to a reference voiceprint.

According to one or more embodiments, the control device 15 is further configured to receive an additional voice command from the user to add an additional premises device 14 to a premises security system 11, determine a grouping of the premises devices 14 and the additional premises device 14 based at least in part on at least one of the plurality of voice responses, and the determining of one of the premises device 14 configuration for the premises device 14 or the premises security system configuration is further based at least in part on the grouping.

Figure 4:
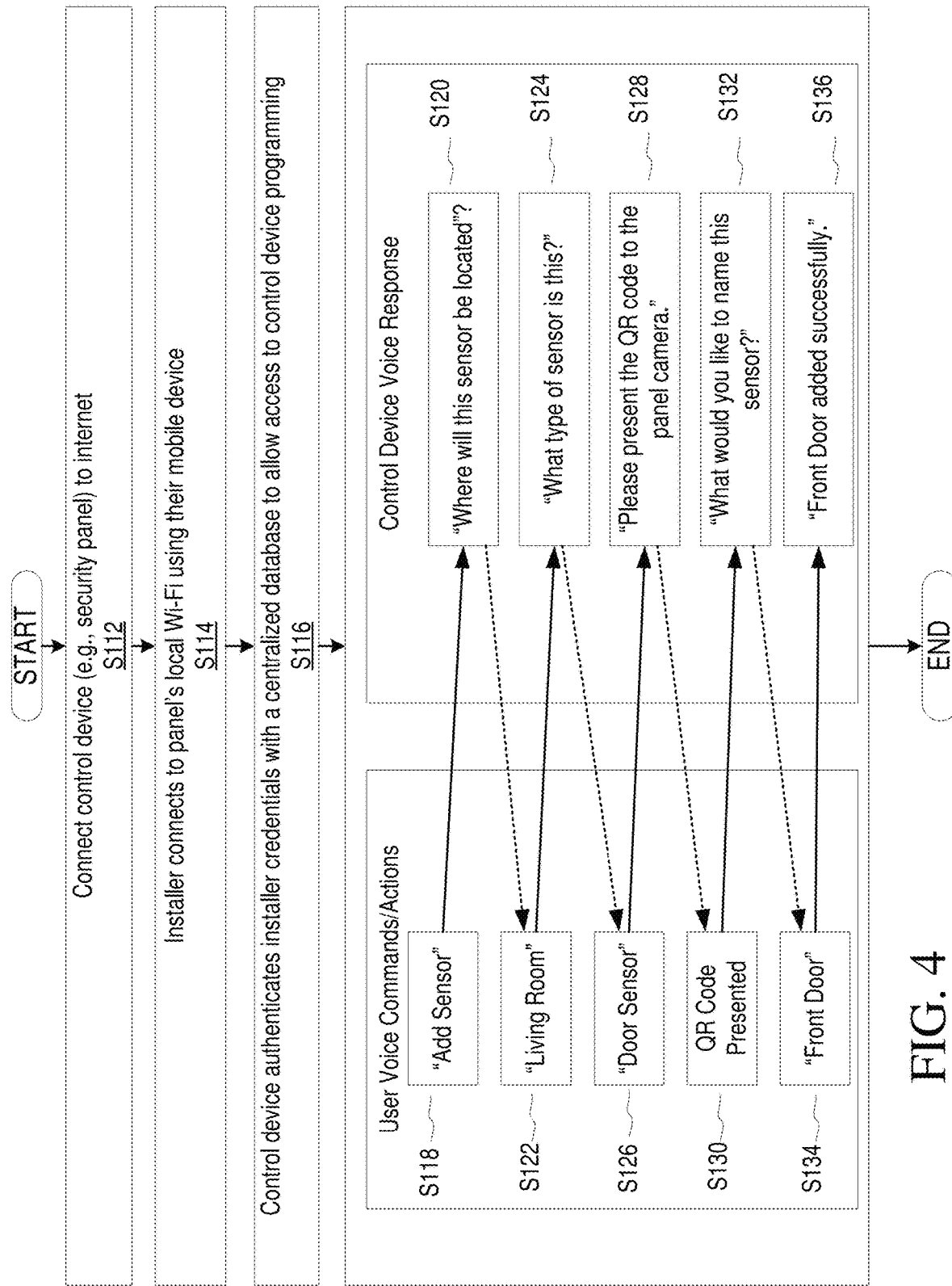
FIG. 4 is a flowchart of another example process implemented by a control device according to some embodiments of the present disclosure.

FIG. 4 is a flowchart illustrating an example premises device 14 enrollment procedure according to one or more embodiments of the present disclosure. In a first step, (Block S112), the control device 15 (e.g., a premises security system 11 panel device) may connect to one or more networks 18, such as the internet, an enterprise network, a private intranet, etc. Next (Block S114), the user (e.g., an installer, technician, end user, etc.) connects a user interface device 12, such as an iOS or Android smartphone device, a laptop computer, etc.) to the control device 15 via, e.g., a WiFi connection, a Bluetooth connection, a near field communication connection, etc., using, e.g., communication interface 22. Next (Block S116), the control device 15 authenticates installer credentials using, e.g., a centralized database, to allow access to programming and/or configuring the control device 15 settings. The installer credential may include, e.g., a passcode, fingerprint, voiceprint, etc., which may be entered by the user via, e.g., the user interface device 12, and/or via another input (e.g., microphone 23, image sensor 24, etc.). The control device 15 (e.g., via enrollment unit 16) initiates an enrollment process, in which the user provides voice commands, and the control device 15 provides voice responses and/or additional questions for obtaining additional attributes of the premises device 14 for determining a configuration.

FIG. 4 further illustrates an example of enrolling a living room door sensor as a premises device 14 to the premises security system 11. The user provides a voice command (Block S118) indicating that the user wishes to add a new premises device 14 ("Add Sensor"). For example, the control device 15 may be a panel that is arranged to receive the "Add Sensor" audio, process it to convert the speech to text, determine the intent of the text, determine that additional information is needed for the configuration, and generate a voice response (Block S120) for playback requesting additional information, such as location information ("Where will this sensor be located?"). Next, the user responds with a voice command (Block S122) providing the requested location information ("Living Room"). Control device 15 may receive the "Living Room" audio, processes it to convert the speech to text, determines the intent of the text, determines that the attribute "Location=Living Room" is to be added to the configuration for the premises device 14, updates the configuration accordingly, and determines that additional information is still needed for the configuration (e.g., a premises device 14 type), and generates a voice response (Block S124) for playback requesting additional information regarding type. Next, the user responds with a voice command (Block S126) providing the requested type information ("Door Sensor"). Control device 15 may receive the "Door Sensor" audio, processes it to convert the speech to text, determines the intent of the text, determines that the attribute "Type=Door Sensor" is to be added to the configuration, updates the configuration accordingly, determines that additional information may be needed for the configuration, and generates a voice response (Block S132) requesting additional information, e.g., a QR code ("Please present the QR code to the panel camera").

Next, the user responds by presenting (Block S130) the QR code (or similar code, such as a barcode, an alphanumeric sequence, etc.), which may be printed on a surface of the premises device 14 and/or may be printed on a piece of paper which accompanies the premises device and/or which may be downloadable to the user interface device 12 (e.g., smartphone device or similar electronic device including a display screen) and presented to the control device 15 image sensor 24. The control device 15 receives the image including the QR code (or similar code), decodes the image to determine the QR code (or similar code), and maps the QR code (or similar code) to one or more associated attributes of the premises device 14, updates the configuration based on the one or more attributes associated with the QR code (or similar code), determines additional information may be needed for the configuration (e.g., name), and generates a voice response (Block S132) for playback requesting premises device 14 name information ("What would you like to name this sensor?"). In some embodiments, the mapping of the QR code (or similar code) to the one or more attributes may include using the code to query a database, which may be local (e.g., stored in memory 30) and/or remote (e.g., downloadable from a remote server, remote monitoring center 20, etc.) to obtain the corresponding attributes. For example, a QR code may be printed on a surface of a premises device 14, which may be decoded and/or mapped to obtain one or more of the premises device 14 model number, firmware version, serial number, default configuration parameters, etc. Next, the user responds (Block S134) with a voice command (Block S134) providing the requested information. Next, the control device 15 receives audio corresponding to the user voice command, converts the speech to text, determines the intent of the voice command, updates the configuration accordingly ("Name=Front Door"), determines that no additional information or attributes are needed for the configuration, and generates a voice response for playback indicating that the enrollment process for that premises device 14 is completed successfully.

In some embodiments, the user (i.e., installer) may skip and/or pass on one or more voice responses and/or voice commands/actions. For example, the user may choose not to present a QR code (e.g., the user may respond with a "Skip" command), in which case, the control device 15 may determine a default configuration based on a standard or basic set of attributes for the type of premises device 14. As another example, the user may decline to provide a name, in which case the control device 15 may determine a default name (e.g., "Door Sensor 04") for the configuration. As another example, the user may decline to provide a location, in which case, the control device 15 may assign a default location (e.g., "Location 04"), or may assign on location (e.g., "Location=UNDEFINED"), for the configuration.

In some embodiments, the configuration may be used to determine how the premises security system 11 and/or control device 15 respond to premises device 14 messages/alerts/etc. For example, if the user assigns the premises device 14 (e.g., a door sensor) to a "Front Door" location, control device 15 may configure premises security system 11 to assign a lower threshold (e.g., sensitivity threshold) to alerts from the premises device 14 as compared to, e.g., an internal door (e.g., "Master Bedroom Door Sensor"). For example, based on the configuration, a bedroom door may trigger an alert after being left ajar for an hour, whereas a front door may trigger an alert after being left ajar for five minutes. As another example, the configuration may determine what premises security actions the premises security system may take in response to alerts/messages/etc. from the premises device 14. As an example, the premises security system 11 would respond to an alert from a first premises device 14 (e.g., the front door sensor) differently than it would respond to a second premises device 14 (e.g., bedroom door sensor), e.g., by alerting the user's phone but not law enforcement authorities.

In some embodiments, the configuration may be communicated to the premises device 14, which may update its internal configuration (e.g., settings in an internal memory and/or processing circuitry) upon receiving the configuration determined by the control device 15. For example, a first premises device 14 which is configured as a front door sensor may receive a first configuration causing it to generate an audible alert when the door is ajar, whereas a second premises device 14 which is configured as a bedroom door sensor may receive a second configuration causing it to not generate an alert when the door is ajar.

As used herein, the term "enroll" may refer to, e.g., updating one or more configurations, settings, files, etc., in a premises security system 11 and/or control device 15, for monitoring, configuring, updating, etc., one or more premises devices 14 in the premises security system 11, and/or for determining one or more premises security actions to perform in response to messages/alerts/etc. received from premises devices 14.

As used herein, "mapping" a voice response to a respective attribute may, for example, include one or more of converting the voice response speech to text, determining the intent of the voice response (e.g., performing natural language processing to determine what device is being identified, what terms are being conveyed in the speech, etc.), and querying a database (e.g., stored in memory 30 and/or in a remote server) based at least in part on the terms and/or intent identified in the voice response, and obtaining one more attributes from the database accordingly. For example, a user voice response stating "master bedroom" for location of the premises device 14 may map to a "bedroom" attribute in the database, which may include and/or be mapped to one or more associated parameters which are then used to determine the configuration. For example, the "bedroom" attribute may be associated with a "low sensitivity threshold" and/or "low alert level" parameter. When the configuration is determined using the attributes (and/or parameters), the premises security system 11 and/or the premises device 14 may then be configured according to the low sensitivity threshold/low alert level parameter.

Thus, in some embodiments, a user response may be mapped (e.g., by enrollment unit 16) to an attribute (e.g., Location="Master Bedroom"), which is then assigned to the configuration (e.g., assigning a value to a location field of a configuration file and/or data structure). In some embodiments, enrollment unit 16 may map a user response to an attribute, and map the attribute to one or more associated (and/or corresponding and/or respective) parameters, e.g., when determining a configuration for the premises device 14 and/or a configuration for the premises security system 11. The parameters may be stored by control device 15 in memory 30, retrieved by control device 15 from a remote server, etc.

Thus, as used herein, "determining a configuration" (as in "determining one of a premises device configuration for the premises device or a premises security system configuration based at least in part on the plurality of respective attributes") may refer to generating, compiling, updating, modifying, etc., a configuration (e.g., a configuration file, a data structure including a list of attributes or settings assigned to the premises device 14, etc.), which may be based on one or more attributes. The attributes may be included (e.g., listed, identified, stored, etc.) in the configuration, and/or may be further mapped to one or more corresponding parameters.

In some embodiments, one or more of the steps (e.g., Blocks S100-S110) described herein as being performed by control device 15 may also/alternatively be performed by one or more remote servers, e.g., remote monitoring center 20, and/or one or more other control devices 15, premises devices 14, etc.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A control device for a premises security system, the control device comprising:
    processing circuitry configured to:
        receive at least one of a voice command or a touch-based input to initiate an enrollment of a premises device in the premises security system;
        synthesize a plurality of audio clips for playback on at least one speaker, each of the plurality of audio clips requesting respective premises device information;
        in response to playback of the plurality of audio clips, receive a plurality of voice responses;
        map each of the plurality of voice responses to a plurality of respective attributes of the premises device;
        determine a premises device configuration for the premises device or a premises security system configuration based at least in part on the plurality of respective attributes, the determining of the premises device configuration or the premises security system configuration comprising at least determining a sensitivity threshold based at least in part on a first voice response of the plurality of voice responses by:
            determining at least one modifier term of the first voice response; and
            mapping the at least one modifier term to a corresponding sensitivity threshold; and
        enroll the premises device in the premises security system based at least in part on the premises device configuration or the premises security system configuration.

2. The control device of claim 1, wherein the plurality of respective attributes comprises at least one of:
    a name of the premises device;
    a location of the premises device;
    a type of the premises device; or
    an operating mode of the premises device.

3. The control device of claim 1, wherein the processing circuitry is further configured to map each of the plurality of voice responses to the plurality of respective attributes by at least:
    predicting a first attribute of the plurality of attributes based at least in part on a first voice response of the plurality of voice responses;
    synthesizing an additional audio clip for playback on the at least one speaker, the additional audio clip reciting the predicted first attribute and requesting a confirmation from the user;
    in response to playback of the additional audio clip, receiving an additional voice response indicating whether the predicted first attribute is accurate; and
    the mapping of the first voice response to the first attribute is based at least in part on the predicted first attribute being accurate.

4. The control device of claim 3, wherein the processing circuitry is further configured to:
    predict the first attribute using a trained machine learning model; and
    update the trained machine learning model based at least in part on the additional voice response indicating whether the predicted first attribute is accurate.

5. The control device of claim 1, wherein the processing circuitry is further configured to:
    synthesize an additional audio clip for playback on the at least one speaker, the additional audio clip reciting an additional instruction for the user to present one of a barcode and a quick response (QR) code associated with the premises device to an image sensor of the control device;
    in response to playback of the additional audio clip, receive an image corresponding to the QR code or the barcode;
    determine at least one additional attribute based at least in part on the QR code or the barcode; and
    determine the premises device configuration for the premises device or the premises security system configuration further based at least in part on the at least one additional attribute.

6. The control device of claim 1, wherein the processing circuitry is further configured to:
    synthesize an additional audio clip for playback on the at least one speaker, the additional audio clip reciting an additional instruction for the user to place the premises device in a field of view of an image sensor of the control device;
    in response to playback of the additional audio clip, receive an image corresponding to the premises device;
    determine a classification of the premises device based at least in part on the image; and
    determine the premises device configuration for the premises device or the premises security system configuration further based at least in part on the classification.

7. The control device of claim 1, wherein the processing circuitry is further configured to authenticate the user prior to enrolling the premises device in the premises security system by at least:
    identifying a passcode in at least one of the voice command or at least one of the plurality of voice responses; and
    comparing the passcode to a reference passcode.

8. The control device of claim 1, wherein the processing circuitry is further configured to authenticate the user prior to enrolling the premises device in the premises security system by at least:
    identifying a voiceprint based at least in part on at least one of:
        the voice command; or
        at least one of the plurality of voice responses; and
    comparing the voiceprint to a reference voiceprint.

9. The control device of claim 1, wherein the processing circuitry is further configured to:
  receive an additional voice command from the user to add an additional premises device to a premises security system;
  determine a grouping of the premises devices and the additional premises device based at least in part on at least one of the plurality of voice responses; and
  determine the premises device configuration for the premises device or the premises security system configuration further based at least in part on the grouping.

10. A method implemented by a control device in a premises security system, the method comprising:
  receiving at least one of a voice command or a touch-based input to initiate an enrollment of a premises device in the premises security system;
  synthesizing a plurality of audio clips for playback on at least one speaker, each of the plurality of audio clips requesting respective premises device information;
  in response to playback of the plurality of audio clips, receiving a plurality of voice responses;
  mapping each of the plurality of voice responses to a plurality of respective attributes of the premises device;
  determining a premises device configuration for the premises device or a premises security system configuration based at least in part on the plurality of respective attributes, the determining of the premises device configuration or the premises security system configuration comprising at least determining a sensitivity threshold based on at least in part on a first voice response of the plurality of voice responses by:
    determining at least one modifier term of the first voice response; and
    mapping the at least one modifier term to a corresponding sensitivity threshold; and
  enrolling the premises device in the premises security system based at least in part on the premises device configuration or the premises security system configuration.

11. The method of claim 10, wherein the plurality of respective attributes comprises at least one of:
  a name of the premises device;
  a location of the premises device;
  a type of the premises device; or
  an operating mode of the premises device.

12. The method of claim 10, wherein mapping each of the plurality of voice responses to the plurality of respective attributes comprises at least:
  predicting a first attribute of the plurality of attributes based at least in part on a first voice response of the plurality of voice responses;
  synthesizing an additional audio clip for playback on the at least one speaker, the additional audio clip reciting the predicted first attribute and requesting a confirmation from the user;
  in response to playback of the additional audio clip, receiving an additional voice response indicating whether the predicted first attribute is accurate; and
  the mapping of the first voice response to the first attribute is based at least in part on the predicted first attribute being accurate.

13. The method of claim 12, wherein the method further comprises:
  predicting the first attribute using a trained machine learning model; and
  updating the trained machine learning model based at least in part on the additional voice response indicating whether the predicted first attribute is accurate.

14. The method of claim 10, wherein the method further comprises:
  synthesizing an additional audio clip for playback on the at least one speaker, the additional audio clip reciting an additional instruction for the user to present one of a barcode and a quick response (QR) code associated with the premises device to an image sensor of the control device;
  in response to playback of the additional audio clip, receiving an image corresponding to the QR code or the barcode;
  determining at least one additional attribute based at least in part on the QR code or the barcode; and
  determining one of the premises device configuration for the premises device or the premises security system configuration further based at least in part on the at least one additional attribute.

15. The method of claim 10, wherein the method further comprises:
  synthesizing an additional audio clip for playback on the at least one speaker, the additional audio clip reciting an additional instruction for the user to place the premises device in a field of view of an image sensor of the control device;
  in response to playback of the additional audio clip, receiving an image corresponding to the premises device;
  determining a classification of the premises device based at least in part on the image; and
  determining the premises device configuration for the premises device or the premises security system configuration further based at least in part on the classification.

16. The method of claim 10, wherein the method further comprises authenticating the user prior to enrolling the premises device in the premises security system by at least:
  identifying a passcode in at least one of:
    the voice command; or
    at least one of the plurality of voice responses; and
  comparing the passcode to a reference passcode.

17. The method of claim 10, wherein the method further comprises authenticating the user prior to enrolling the premises device in the premises security system by:
  identifying a voiceprint based at least in part on at least one of:
    the voice command; or
    at least one of the plurality of voice responses; and
  comparing the voiceprint to a reference voiceprint.

18. The method of claim 10, wherein the method further comprises:
  receiving an additional voice command from the user to add an additional premises device to a premises security system;
  determining a grouping of the premises devices and the additional premises device based at least in part on at least one of the plurality of voice responses; and
  determining the premises device configuration for the premises device or the premises security system configuration further based at least in part on the grouping.

* * * * *